United States Patent
Heminger et al.

(12) 
(10) Patent No.: US 6,195,222 B1
(45) Date of Patent: Feb. 27, 2001

(54) DISK DRIVE WITH SEEK PROFILE SELECTION BASED ON A QUEUED VS. NON-QUEUED ENVIRONMENT

(75) Inventors: Mark D. Heminger; Eric G. Oettinger, both of Rochester, MN (US)

(73) Assignee: Western Digital Corporation, Irvine, CA (US)

( * ) Notice: Subject to any disclaimer, the term of this patent is extended or adjusted under 35 U.S.C. 154(b) by 0 days.

(21) Appl. No.: 09/186,786

(22) Filed: Nov. 4, 1998

(51) Int. Cl.[7] .................................................. G11B 5/596
(52) U.S. Cl. ..................................... 360/78.07; 360/78.04; 360/78.06
(58) Field of Search ........................ 360/78.07, 78.04, 360/78.06, 75, 77.04, 78.09

(56) References Cited

U.S. PATENT DOCUMENTS

| | | | |
|---|---|---|---|
| 4,937,689 | * 6/1990 | Seaver et al. | 360/78.07 |
| 5,150,266 | * 9/1992 | Albert | 360/78.04 |
| 5,313,585 | * 5/1994 | Jeffries et al. | 711/201 |
| 5,473,761 | * 12/1995 | Parks et al. | 711/4 |
| 5,483,641 | * 1/1996 | Jones et al. | 710/3 |
| 5,570,332 | * 10/1996 | Heath et al. | 369/50 |
| 5,664,143 | * 9/1997 | Olbrich | 711/112 |
| 5,668,680 | * 9/1997 | Tremaine | 360/78.07 |
| 5,671,365 | * 9/1997 | Binford et al. | 710/100 |
| 5,859,742 | * 1/1999 | Takaishi | 360/78.01 |
| 5,875,343 | * 2/1999 | Binford et al. | 710/263 |
| 6,002,544 | * 12/1999 | Yatsu | 360/78.09 |
| 6,101,065 | * 8/2000 | Alfred et al. | 360/78.04 |
| 6,111,720 | * 8/2000 | Clare et al. | 360/78.06 |

FOREIGN PATENT DOCUMENTS

0022614 * 4/2000 (WO) ................................ G11B/5/55

OTHER PUBLICATIONS

Morganstern, David. "Graphics' Demands on Mass Storage", UNIX Review's Performance Computing, vol. 17, No. 10, Sep. 1999, pp. 48–54.*

* cited by examiner

Primary Examiner—John Breene
Assistant Examiner—Luke S. Wassum
(74) Attorney, Agent, or Firm—Milad G Shara (57) ABSTRACT

A disk drive and method of optimizing data access time by selecting a seek profile and/or settle criteria based on a queued or non-queued environment. The disk drive includes an actuator and a servo system, wherein the servo system is directed to move the actuator as a result of an input/output command received from a host by an interface processor. The disk drive may execute the input/output commands in a queued or non-queued environment. The servo system commands the actuator to perform a seek using a seek profile and defines settling criteria for the seek operation. The seek profile includes an acceleration profile and a deceleration profile. The method includes the step of providing a queued seek profile and a queued settling criteria for a seek used to position the actuator to execute a command in a queued environment. A non-queued seek profile and a non-queued settling criteria are defined for a seek used to position the actuator to execute a command in a non-queued environment, the non-queued seek profile being different than the queued seek profile. Seeks are performed using the queued seek profile and settling criteria and the non-queued seek profile and settling criteria. Optionally, the queued settling criteria is different than the non-queued settling criteria.

30 Claims, 8 Drawing Sheets

DISK DRIVE WITH SEEK PROFILE SELECTION BASED ON A QUEUED VS. NON-QUEUED ENVIRONMENT

BACKGROUND OF THE INVENTION

1. Field of the Invention

The present invention relates to a disk drive having optimized access time in performing a track seeking operation, and more particularly, a disk drive and method for selecting a seek profile and settle criteria based on a queued or non-queued environment for optimizing data access time in a disk drive.

2. Description of the Art

Hard disk drives store large volumes of data on one or more disks mounted on a spindle assembly. The spindle assembly includes a spindle motor for rotating the disks at a substantially constant angular velocity. Disk drives employ a disk control system for interfacing with a host (e.g., a computer) to control the reading and writing of data on a disk. Each disk includes up to two disk surfaces which are capable of storing data. On each disk surface, user data is stored in concentric circular tracks between an outside diameter and an inside diameter of the disk. Servo systems are employed to maintain alignment of a transducer head with a desired target data track (termed "track following"), for reading and writing user data on the disk surface within desired control parameters.

Embedded servo systems store servo data on the same disk surface as user data to provide control signals and information employed in the operation of the servo system. User data on the disk surface is divided into groups of data sectors. Embedded servo information is recorded in servo sectors placed in arcuate, radially continuous narrow wedges between the groups of data sectors. In this regard, servo sectors are commonly referred to as "servo wedges". For example, a concentric data track may include 60 equally spaced servo sectors with data regions (i.e., a region containing data sectors, groups of data sectors or partial data sectors) located between adjacent pairs of servo sectors.

Each servo sector includes fields containing track identification used in track seeking operations and tracking information used in track following operations. For example, the track identification information may include track number or address and sector number, and the tracking information may include automatic gain control (AGC) and phase lock oscillator information (PLO), timing information (e.g. a servo sync word) and servo burst information for positioning a transducer head over the disk surface. The fields are defined by transitions written on the disk surface in patterns readable by the servo system. During execution of a command to read or write data to a target data sector on the disk surface, servo information is sampled as the servo sectors pass under the associated transducer head. Sector timing is maintained by detecting a timing field within each servo sector.

One measure of performance of a hard disk drive is its data access time. To maximize performance of a disk drive, it is desirable to minimize data access time, including the time required to move the disk drive actuator from a current data track to the "target" data track. The process of moving a head from a current track position to a desired or target track position is known as a "seek". The disk drive includes a servo system that is utilized both to seek to a selected target track and thereafter follow the target track on the disk. A seek to a selected target track is commonly made in accordance with a profile of command effort to the actuator for a respective seek distance, which is stored in memory and accessible by the servo system controller.

The seek profile can be described in terms of acceleration, velocity, or position. A seek profile (described in terms of velocity) can include three components; an acceleration profile, an optional coast profile, and a deceleration profile. The acceleration profile (typically, but not necessarily set to the maximum acceleration permitted by the hardware) involves the initial portion of the seek when the actuator is gaining speed. The coast profile, which may or may not be used, holds the velocity substantially constant at some predetermined velocity. The deceleration profile ends with both acceleration and velocity close to zero as the head approaches the target track.

Figure 1:
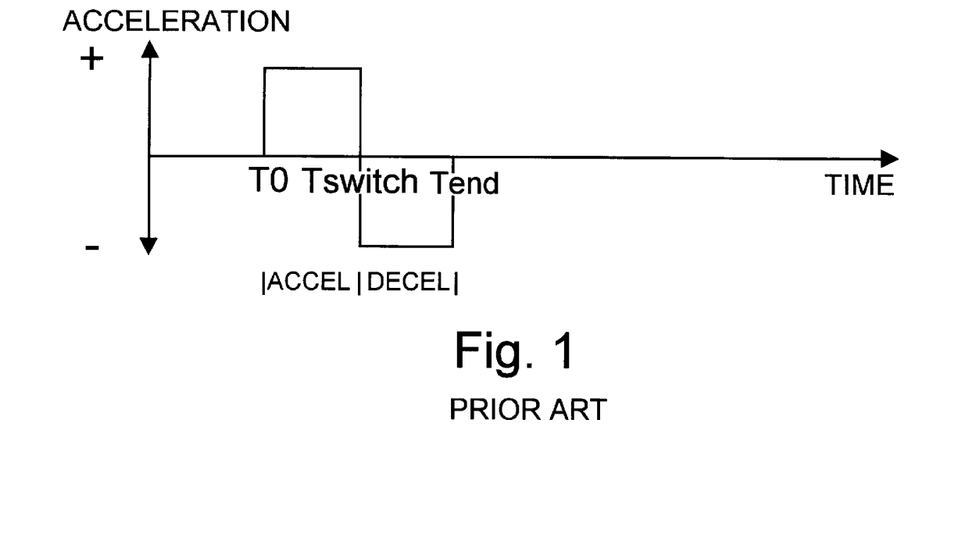
FIG. 1 is a graph illustrating a prior art seek profile showing a plot of acceleration versus time.
Figure 2:
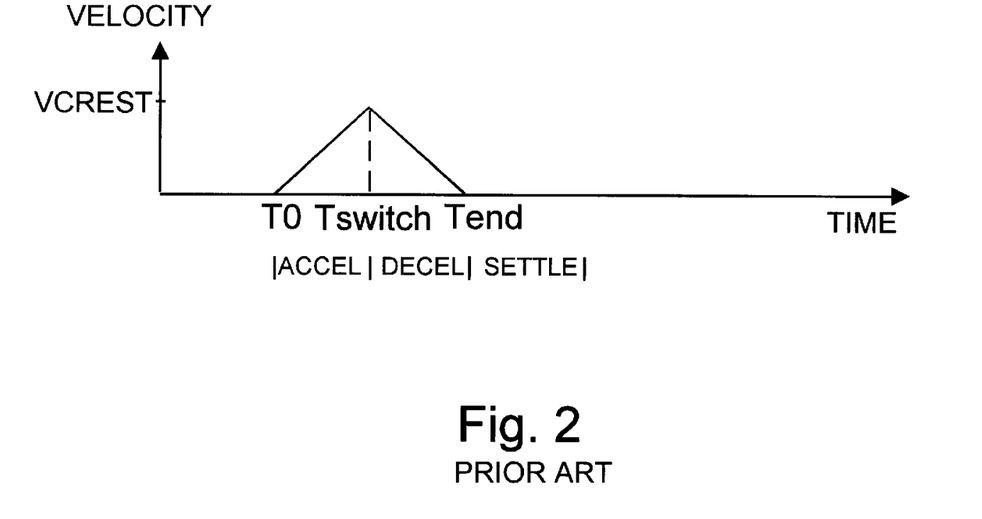
FIG. 2 is a graph illustrating a prior art velocity profile corresponding to the acceleration seek profile of FIG. 1.

In FIGS. 1–4, sample idealized acceleration and velocity seek profiles for two prior art seeks for a given distance are shown. Referring to FIGS. 1 and 2, acceleration and velocity profiles graphically illustrate a first prior art seek operation. In FIG. 1, the actuator is commanded to accelerate at time T0. This acceleration is maintained until the velocity of the actuator reaches a peak value VCREST, shown in FIG. 2. This occurs at time Tswitch. The actuator is then commanded to decelerate, until time Tend at which time the deceleration and velocity are brought back to zero, and the head is positioned at the target track.

Figure 3:
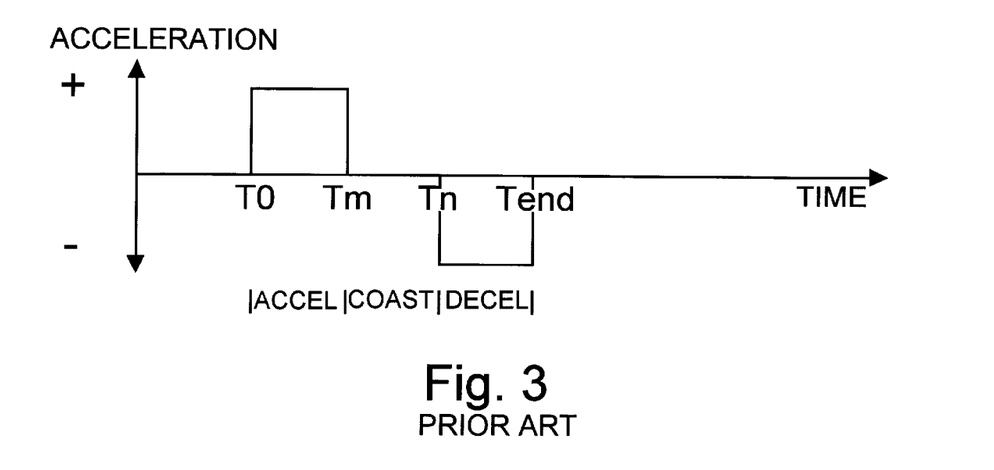
FIG. 3 is a graph illustrating another prior art seek profile showing a plot of acceleration versus time in which a coast period is utilized.
Figure 4:
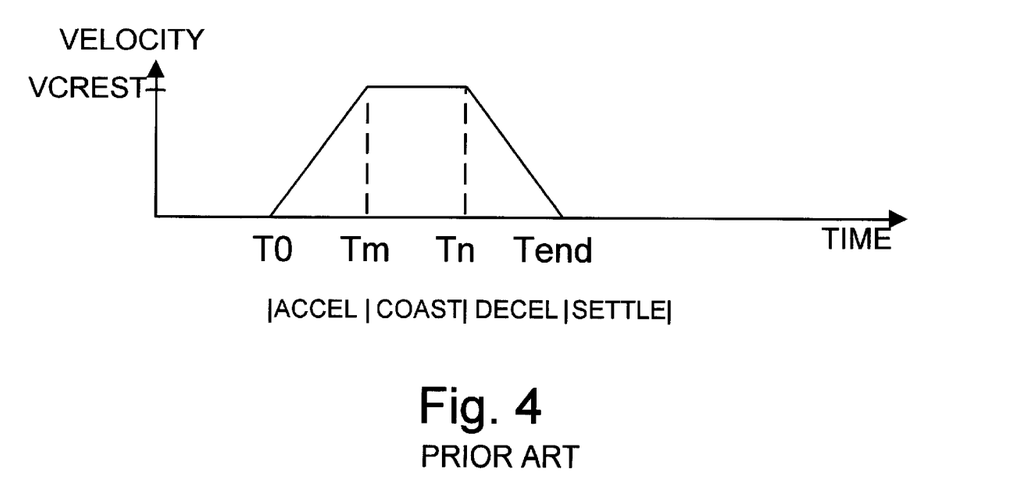
FIG. 4 is a graph illustrating a velocity seek profile corresponding to the acceleration seek profile of FIG. 3.

Referring to FIGS. 3 and 4, acceleration and velocity profiles graphically illustrate another prior art seek operation in which a coast period is used. As illustrated, at time T0 the actuator is commanded to accelerate. This acceleration is held until the actuator reaches maximum velocity VCREST at time Tm, where Tm is the length of time required to reach maximum velocity. In this example, the maximum velocity VCREST is held (in a "coast" mode) until time Tn at which time the actuator is commanded to decelerate so that the velocity decreases to zero at time Tend.

The velocity profiles illustrated in FIGS. 2 and 4 are idealized profiles in which the head velocity reaches zero at time Tend. It is understood in the art that many variables, including resonant modes of the actuator and stored energy in the actuator, prevent a precise correction of actuator velocity which would result in the head landing exactly on track at the conclusion of the seek. These variables may cause the head to overshoot the target track. In any event, a settling period is required to position the head within an acceptable range of the target track center. The settling period adds to the total time of the seek operation and may be extended or reduced according to the shape of the applied seek profile (e.g., a more aggressive, or faster profile will cause larger and longer residual vibrations). The settling period is defined by settling criteria which may include a window of proximity to the target track and a number of servo samples indicating that the head is within the window.

Disk drives are capable of storing large amounts of data in part due to a corresponding high density of data tracks on the disk. As such, the heads must be closely aligned with the target track for reading and/or writing of data without error. Off track thresholds or windows are defined about the tracks which are required to define completion of the seek. These can be termed a settle window (e.g., a read settle window and a write settle window).

A hard disk drive may at any given time be operating in a queued or non-queued environment for processing command instructions received from a host. In a typical queued environment, the host issues a sequence of commands to the disk drive interface processor. There may in fact be a barrage of such command sequences sent to the disk drive during particular periods of host activity. The interface processor places the commands in one or more queues for execution and typically employs a command re-ordering algorithm which sorts the commands into an order of execution which will optimize disk drive performance and reduce disk drive latency.

By contrast with the queued environment, the typical non-queued environment is indicated when commands are received and executed without re-ordering. This may occur when queuing is disabled by the host, or when commands are issued in sequences or with restrictions which permit or require the disk to complete execution of each command before proceeding to the next. In any event, the interface processor makes a determination of whether the disk drive is presently operating in one or the other of a queued or non-queued environment.

For delayed write commands, i.e. write commands which are stored in the cache and treated as complete even though not yet written to the media, a special case may occur where the interface processor treats the commands as being executed in a queued environment even when otherwise in a non-queued environment.

While in the queued environment, the disk drive relies on a predictable arrival of the actuator at the location at which data transfer is to occur. The arrival is typically forecast at a servo wedge level, identifying a servo wedge which precedes the target data location. For predictable execution of each ordered command, the time to seek, settle and verify the location by the preceding servo wedge is taken into account. Rotational latency once the head arrives on track is also a factor in optimization. For example for shorter distances, the command re-ordering process may select an apparently more distant track over a less distant track based on the relative rotational position of a target data sector upon arrival at the target track.

In particular, each ordered queued command has a calculated time window in which to seek to the target track, settle, and execute the desired command before seeking to the next target track. If the disk drive is not sufficiently settled in order to perform the desired operation within the desired time window, the disk may have to wait for an unplanned revolution for the target data sector to be positioned below the actuator head to execute the desired command, thus impacting disk drive performance.

Increased aggressiveness in the seek profile can result in faster moves at the expense of settle consistency. Moving faster excites more residual vibrations in the system during the settle and also may make the controller estimator more prone to error during the deceleration phase of the seek. Known systems utilize the same seek profile to position the head for a given seek distance regardless of whether they are executing a queued or non-queued command. The seek profiles tend to be less aggressive in order to guarantee predictable performance during execution of commands in a queued environment, while maintaining a level of raw seek performance. A need exists therefore for a disk drive which efficiently manages positioning an actuator in both a queued and a non-queued environment.

SUMMARY OF THE INVENTION

The present invention provides a disk drive and method for selecting a seek profile and settle criteria based on a queued or non-queued environment for optimizing data access time in the disk drive. By using different seek profiles and settle criteria for a queued or non-queued environment, predictability may be improved for queued commands while data access time may be reduced for non-queued commands.

In one embodiment, the present invention provides a method of optimizing a data access time in a disk drive having an actuator and a servo system. The servo system is directed to move the actuator as a result of an input/output command received from a host by an interface processor. The disk drive may execute the input/output command in a queued or non-queued environment. The servo system commands the actuator to perform a seek using a seek profile and defines settling criteria for the seek operation. The seek profile includes an acceleration profile and a deceleration profile. The method includes the step of providing a queued seek profile and queued settling criteria for a seek used to position the actuator to execute a command in a queued environment. A non-queued seek profile and non-queued settling criteria are defined for a seek used to position the actuator to execute a command in a non-queued environment. The non-queued seek profile is different than the queued seek profile. Seeks are performed using the queued seek profile and settling criteria and the non-queued seek profile and settling criteria.

The time required for performing a seek over a nominal distance using the non-queued seek profile is less than the time required for performing a seek over the nominal distance using the queued seek profile. The queued and non-queued seek profiles may each comprise a plot defining the target velocity versus distance to go. The method may further comprise the step of defining a base profile for a seek. The step of providing a non-queued seek profile may further comprise the step of providing a non-queued coefficient and determining the non-queued seek profile by multiplying the queued seek profile by the non-queued coefficient. In one aspect, the non-queued coefficient is greater than one.

The method may further comprise the step of providing a base profile for a seek. The step of providing a queued seek profile may further comprise the step of providing a queued coefficient and determining the queued seek profile by multiplying the queued coefficient by the base profile. In one application, the step of providing a queued seek profile further includes the step of determining the queued seek profile by multiplying the non-queued seek profile by a coefficient, wherein the coefficient is less than one.

The step of providing the queued seek profile may further include the step of providing a queued acceleration profile. The step of providing a non-queued seek profile may further include the step of providing a non-queued acceleration profile, the queued acceleration profile being different than the non-queued acceleration profile for a respective seek distance.

In another aspect, the step of providing the queued seek profile may further include the step of providing a queued velocity profile.

The step of providing a non-queued seek profile may further include the step of providing a non-queued velocity profile, the queued velocity profile being different than the non-queued velocity profile for a respective seek distance.

Optionally, the non-queued settling criteria is different than the queued settling criteria. In one aspect, the settling criteria includes a window which defines the required proximity of the actuator to a target track for execution of a command in a queued or non-queued environment. Providing the queued settling criteria includes the step of providing a queued settle window. Providing the non-queued settling criteria includes the step of providing a non-queued settle window, the non-queued settle window being different than the queued settle window. In one aspect, the non-queued settle window is wider than the queued settle window. The method may further include the step of sampling the position of the actuator at predetermined time intervals. The commands are executed in a queued or non-queued environment after a desired number of samples fall within the corresponding queued settle window or non-queued settle window. In one application, the desired number of samples for the queued settle window is smaller than the desired number of samples for the non-queued settle window.

In another embodiment the present invention provides a disk drive having an optimized data access time. The disk drive includes an actuator and a servo system. The servo system is directed to move the actuator as a result of an input/output command received from a host by an interface processor. The disk drive may execute the input/output command in a queued or non-queued environment. The servo system commands the actuator to perform a seek using a seek profile and providing settling criteria for the seek operation. The seek profile includes an acceleration profile and a deceleration profile. The disk drive includes a queued seek profile and a queued settling criteria for a seek used to position the actuator to execute a command in a queued environment. A non-queued seek profile and a non-queued-settling criteria are provided for a seek used to position the actuator to execute a command in a non-queued environment, the non-queued seek profile being different than the queued seek profile. Means are provided for performing seeks using the queued seek profile and settling criteria and the non-queued seek profile and settling criteria.

In one application, the time required for performing a seek over a nominal distance using the non-queued seek profile is less than the time required for performing a seek over the nominal distance using the queued seek profile. The queued and non-queued seek profiles each comprise a plot providing a target velocity versus distance to go.

The disk drive may further include a base profile for a seek, wherein the base profile is defined by a plot providing a target velocity versus distance to go. The non-queued seek profile further comprises a non-queued coefficient. The non-queued seek profile is determined by multiplying the non-queued coefficient by the queued seek profile for a respective distance to go. In one aspect, the non-queued coefficient is greater than one.

The disk drive may further comprise a base profile for a seek, wherein the base profile is defined by a plot providing a target velocity versus distance to go. The queued seek profile may further comprise a queued coefficient and the queued seek profile is determined by multiplying the queued coefficient by the target velocity for a respective distance to go. In one aspect, the queued seek profile is determined by multiplying the non-queued seek profile by a coefficient, wherein the coefficient is less than one.

The queued seek profile can further include a queued acceleration profile. The non-queued seek profile can further include a non-queued acceleration profile, the queued acceleration profile being different than the non-queued acceleration profile for a respective seek distance. In another aspect, the queued seek profile can further include a queued velocity profile. The non-queued seek profile can further include a non-queued velocity profile, the queued velocity profile being different than the non-queued velocity profile for a respective seek distance.

Optionally, the non-queued settling criteria is different than the queued settling criteria. In one aspect, the settling criteria includes a window which defines the required proximity of the actuator to the target track for execution of a command in a queued or non-queued environment. The queued settling criteria includes a queued settle window. The non-queued settling criteria includes a non-queued settle window, the non-queued settle window being different than the queued settle window. In one aspect, the non-queued settle window is wider than the queued settle window.

The disk drive may further include means for sampling the position of the actuator at predetermined time intervals. Means are provided for executing a command in a queued or non-queued environment after a desired number of samples fall within the corresponding queued settle window or non-queued settle window. In one aspect, the desired number of samples for the queued settle window is smaller than the desired number of samples for the non-queued settle window.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Within the drawings, like numbers designate like elements.

DETAILED DESCRIPTION

The present invention provides a method for optimizing data access time by independently optimizing the seek profiles for non-queued seek and queued seek operations. By independently optimizing the seek profiles for each type of seek, predictability and consistency may be achieved for queued seeks, while data access times may be reduced for non-queued seeks. Specifically, the acceleration portion of each profile may differ (in amplitude and duration) between non-queued and queued seeks, the coast portion of each profile may differ (in amplitude and duration) between non-queued and queued seeks (or may be omitted), the deceleration portion of each profile may differ (in amplitude or duration) between non-queued and queued seeks, and the settle criteria may differ for non-queued and queued seeks.

Figure 5:
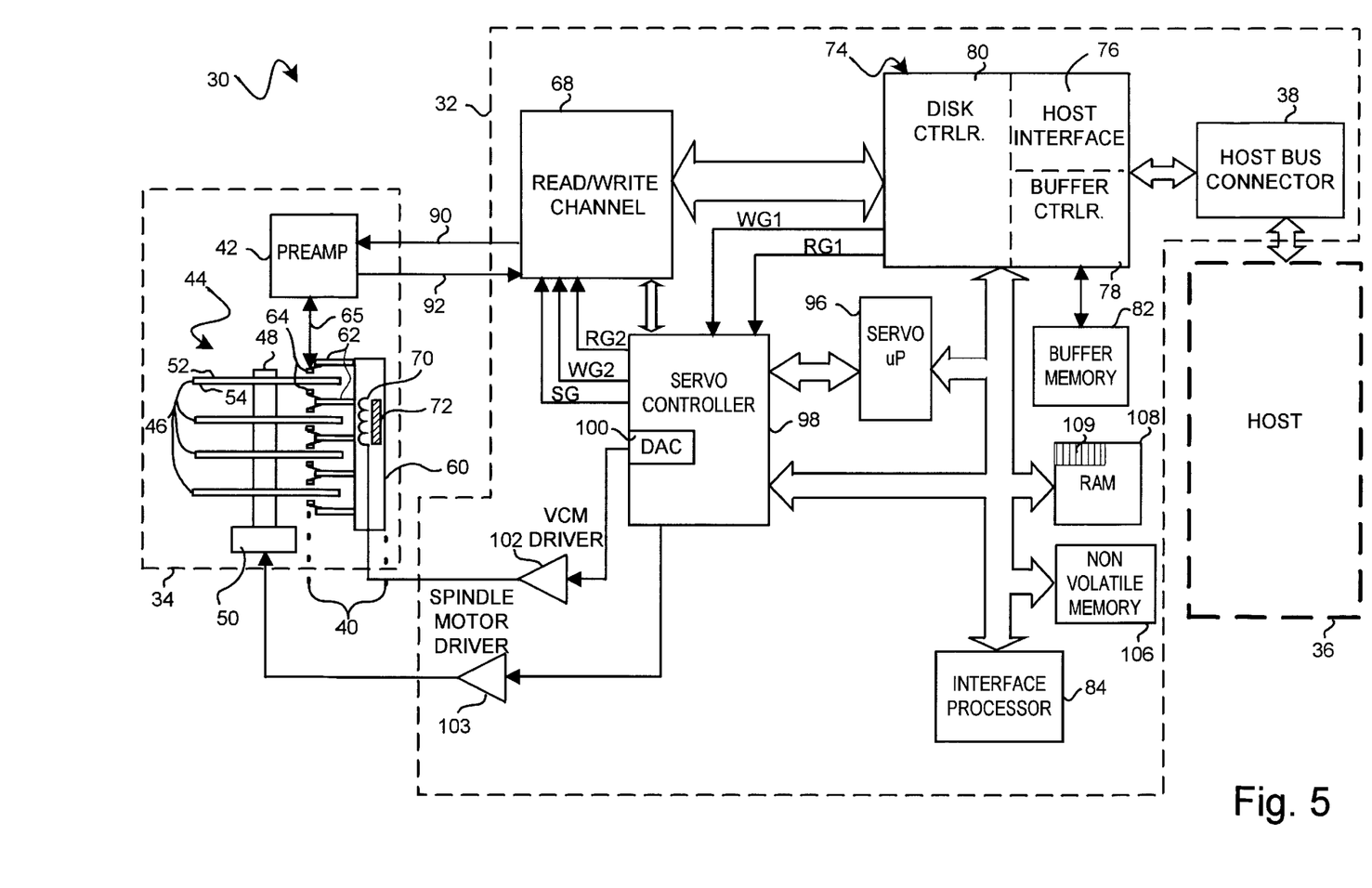
FIG. 5 is a block diagram illustrating one embodiment of a hard disk drive system having different seek profile and/or settle criteria selection based on a queued or non-queued environment for optimized data access times in accordance with the present invention.

A hard disk drive according to the present invention is illustrated generally at 30 in FIG. 5. Disk drive 30 employs a method for optimizing data access time by selecting a seek profile and/or settling criteria based on a queued or non-queued environment.

Disk drive 30 includes a disk control system 32 and a head disk assembly (HDA) 34. Disk control system 32 includes circuitry and processors which provide an intelligent disk control system interface between a host system 36 and HDA 34 for execution of non-queued and queued read and write commands. Host system 36 can include a microprocessor based data processing system such as a personal computer, or other system capable of performing a sequence of logical operations. Data is transmitted between host system 36 and disk control system 32 via a host bus connector 38.

HDA 34 includes an actuator assembly 40, a preamplifier 42, and a disk assembly 44. Disk assembly 44 includes one or more magnetic media disks, such as indicated at 46. Disks 46 are stacked on a spindle assembly 48. Spindle assembly 48 is mechanically coupled to a spindle motor 50 for rotating disks 46 at a high rate of speed. Each disk 46 includes up to two disk recording surfaces (i.e., disk surfaces) capable of storing data thereon, such as indicated at 52 and 54.

Actuator assembly 40 includes a voice coil motor (VCM) 60 and multiple actuator arms 62 extending from VCM 60. Transducer heads 64 are disposed at the ends of actuator arms 62 for communicating with a respective disk surface such as 52, 54. Transducer heads 64 communicate with disk control system 32 via preamplifier 42 for reading and writing data to the associated disk surface 52, 54. Preamplifier 42 is electrically coupled to transducer heads 64 by connecting means, indicated at 65, for receiving and recording signals which are representative of magnetic transitions on a selected disk surface 52, 54. Preamplifier 42 provides an amplified signal to a read/write channel 68 of disk control system 32. The read/write channel 68 performs encoding and decoding of data written to and read from the disks 46. The read/write channel 68 is described in detail further in the specification.

VCM 60 includes a coil 70 moving in proximity to a permanent magnet 72. Actuator arms 62 are permanently coupled to VCM 60. VCM 60 controllably swings actuator arm 62 and their corresponding transducer heads 64 back and forth over their associated disk surface 52, 54 to access target data tracks formed on the associated disk surface.

Disk control system 32 includes an integrated circuit host interface and disk controller (HIDC) 74 having a host interface 76, a buffer controller 78 and a disk controller 80. Host interface 76 communicates with host system 36 via host bus connector 38 by receiving commands and data from and transmitting status and data back to host system 36. Buffer controller 78 controls a buffer memory 82 employed for storing data from host system 36 which is to be written to a disk surface (e.g., disk surface 52). In addition, buffer controller 78 controls buffer memory 82 for storing data read from disk surface 52. Host interface 76 provides for the data to be transmitted to and from the host system. Buffer memory 82 typically comprises random access memory (RAM), such as dynamic random access memory (DRAM). Disk controller 80 sends data to and receives data from read/write channel 68. Disk controller 80 also provides for error correction and error detection on data read from a disk surface.

An interface processor 84 handles the flow of data commands received by host interface 76 by sending commands to and reading status from disk controller 80. Interface processor 84 ascertains which commands to process from host system 36 and when to process these commands, and directs other tasks performed by disk controller 80.

Read/write channel 68 is coupled to preamplifier 42, indicated by read lines 92 and write lines 90. During a read operation, preamplifier 42 amplifies the transition pulses that are detected by a transducer head 64 associated with a disk surface and amplifies them to a signal level that can be processed by read/write channel 68. Read/write channel 68 receives the magnetic transmission pulses read from the disk surface and further amplifies, filters and converts the transition pulses into digital data which is output to disk controller 80. During a write operation, the read/write channel 68 receives data from disk controller 80 and converts the data into pulses for writing data to a disk surface via write lines 90 and preamplifier 42. Preamplifier 42 generates current to drive the transducer head to write transitions on the disk surface.

A servo processor 96 commands a servo controller 98 to control the position of transducer head 64 over disk 46 at a target data track for subsequent execution of read or write commands. Servo processor 96 receives a representative form of a position signal sensed by transducer head 64, via preamplifier 42 and read/write channel 68 and performs calculations to position transducer head 64 relative to its associated disk surface. A digital-to-analog converter (DAC) 100 in servo controller 98 responds to digital commands from servo processor 96 to provide a corresponding analog signal to VCM driver 102. VCM driver 102 responds to the analog signal from DAC 100 to provide a corresponding current to VCM 60. The current from VCM driver 102 is provided to coil 70 of VCM 60 and causes movement of actuator assembly 40 which in turn causes the attached actuator arms 62 to swing and thereby move transducer head 64 over an associated disk surface 52, 54 to access target data tracks. Servo processor 96 also provides commands to servo controller 98 to control the rotational velocity of spindle motor 50. Servo processor 98 controls the rotational velocity of spindle motor 50 via servo controller 98 and a spindle motor driver 103 to maintain a substantially constant operational rotational velocity of rotating disks 46.

Disk control system 32 further includes read gate RG1 and write gate WG1 electrically coupled between disk controller 80 and servo controller 98. Read gate RG2 and write gate WG2 are electrically coupled between servo controller 98 and read/write channel 68. Read gates RG1 and RG2 must be asserted for reading of data from a disk surface through read/write channel 68. Similarly, write gates WG1 and WG2 must be asserted before writing of data occurs on a disk surface through read/write channel 68. Servo gate signal SG is enabled when reading servo data from a servo sector located on a disk surface. Also, read gate RG1 or write gate WG1 may be asserted, but servo controller 98 may prohibit the reading or writing of data. For example, when writing data to a disk surface, interface processor 84 may command disk controller 80 to write multiple blocks of data to a data region or series of data sectors on a disk surface, but servo controller 98 may prohibit writing by not enabling write gate WG2 if the transducer head is not on track with the desired target track.

Disk drive control system (including servo system) operational programs are stored in non-volatile memory 106, which may be read-only memory (ROM) or flash memory, and may be loaded into RAM 108 for execution. Alternatively, system operational programs may be stored on reserve cylinders on disk 46. Upon startup of hard disk drive 30, disk drive programs, such as the servo system operational programs, are transferred into RAM 108 for fast access by servo processor 96 for positioning transducer head 64 for execution of non-queued and queued commands. RAM 108 also may include seek profile tables 109 for storing separate seek profiles for positioning the actuator head to execute queued and non-queued commands. The use of separate seek profiles stored in tables 109 to optimize disk drive data access time is discussed in detail later in the specification.

In an exemplary operation of disk drive 30, servo processor 96 receives a command to position actuator assembly 40 for accessing data or writing data on a specific target data track on a disk surface 52 or 54. In operation of disk drive 30, disk controller 80 keeps track of where transducer head 64 is passing over data sectors and servo sectors and servo processor 96 keeps track of which circular data track or "cylinder" of data tracks the transducer head is over, and keeps the transducer head tracking or following on the desired target data track.

The current circular data track position of transducer head 64 is stored in RAM 108 to permit servo processor 96 to determine a required seek distance between the current data track and a target data track on disk 46. Based on a queued or non-queued environment, servo processor 96 retrieves a corresponding queued or non-queued seek profile from RAM 108 and provides a digital signal command to DAC 100 corresponding to the seek profile. DAC 100 provides a corresponding analog signal to VCM driver 102 representative of the seek profile. VCM driver 102 provides a current output to coil 70 of VCM 60 for acceleration and/or deceleration of actuator arm 62 to perform a seek operation to move transducer head 64 from the current data track to the target data track. As actuator arm 62 moves from the current data track to the target data track, position information is received through the sensing of the servo sectors or "wedges" disposed on disk surface 52 or 54. Based on this position information, a position signal is provided via preamplifier 42, read/write channel 68, and servo controller 98 to servo processor 96 to provide a representative position of transducer head 64 relative to its associated disk surface 52 or 54. Upon completion of a seek operation and the corresponding alignment of transducer head 64 over the target data track, a read or write command is executed to read data from or write to the target data track.

Disk drive 30 receives commands from host system 36 in a queued or non-queued environment via host interface 76 and interface processor 84. In a queued environment, the disk drive queues the commands in buffer memory 82 and the interface processor 84 employs a command re-ordering algorithm which sorts the queued input/output commands into an order which will optimize disk drive performance and reduce disk drive latency. For example, a reordering algorithm may be used to reduce disk drive latency by putting commands in an order which results in consecutive commands seeking to the closest cylinder or resulting in the shortest seek time period accounting for rotational latency.

Alternatively, in an exemplary non-queued environment, the disk drive 30 executes a series of host commands in the order received without re-ordering a queued stack of commands. Servo processor 96 receives seek commands from interface processor 84 based on the data location specified for each command and selects a seek profile and settle criteria based on whether the input/output command received from host system 36 is executed in a queued or non-queued environment. Preferably, interface processor provides status information with the seek command to characterize whether the environment is queued or non-queued. In a queued environment, the servo processor 96 selects a seek profile which improves data access time by optimizing the predictability and consistency of each ordered seek. In a non-queued environment, the servo processor 96 selects a non-queued seek profile which is more aggressive relative to the queued seek profile resulting in improved data access time. Similarly, different settle criteria may be used for a queued or non-queued environment to optimize data access times.

The selection of seek profiles and settle criteria based on a queued or non-queued command environment to optimize data access times in accordance with the present invention is described in detail in the following paragraphs.

Figure 6:
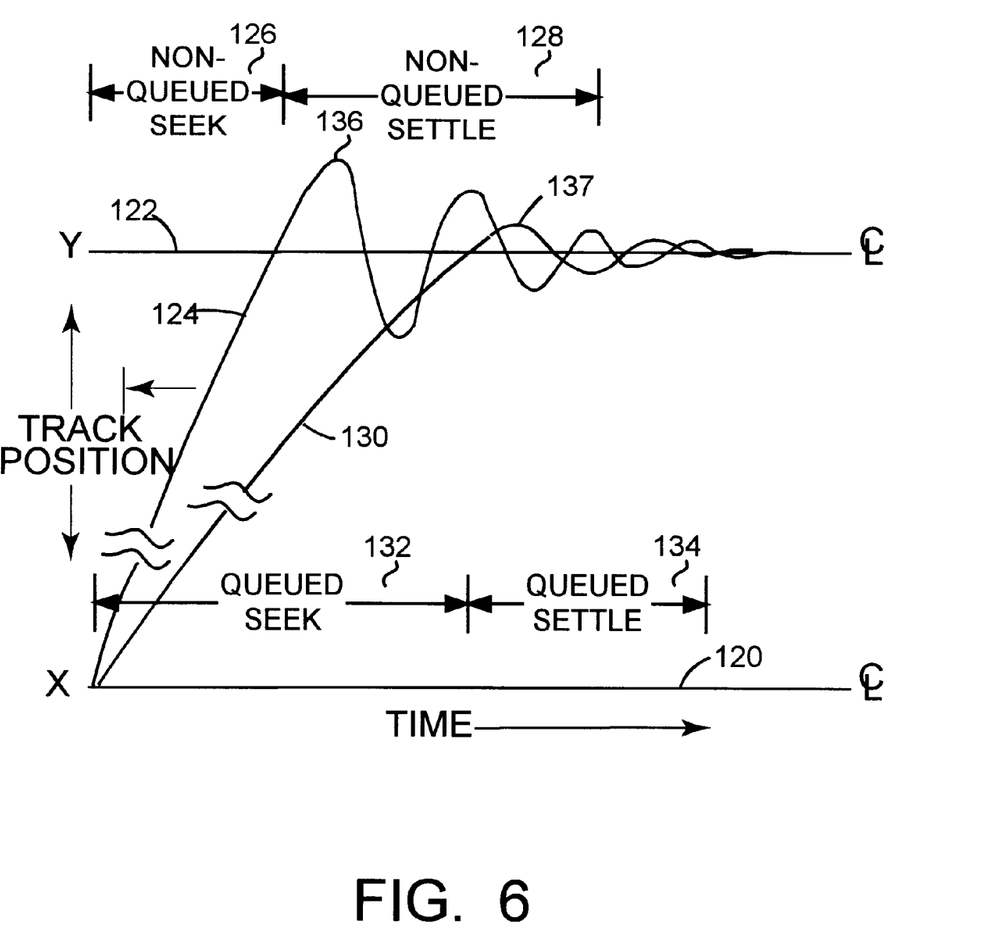
FIG. 6 is a graphical representation illustrating one exemplary embodiment for implementing different seek operations for positioning a head from current track X to target track Y for execution of a queued or non-queued command, in accordance with the present invention.

In FIG. 6, seek profile position plots are shown illustrating a comparison between different seek profiles used for positioning a head for execution of a command in a queued or non-queued environment in accordance with the present invention. By changing characteristics of the seek profile and/or settle criteria, data access times may be optimized for queued and non-queued command environments. The commands can comprise a read or write seek operation. Within each queued or non-queued command environment, read and write operations can be further optimized by using different seek profiles and settle criteria to position the transducer head for a read and write operation for a given seek distance. The different read and write seek profiles in combination with different read and write settle criteria further increase disk drive performance. One suitable disk drive and method having seek profile selection and settle criteria based on read or write operation resulting in optimized data access times, suitable for use with the present invention, is described in commonly assigned U.S. patent application Ser. No. 09/050,519, filed on Mar. 30, 1998 and having a common inventor of the present invention, entitled "Disk Drive With Seek Profile Selection Based On Read/Write Operation," the disclosure of which is incorporated herein by reference.

In the exemplary embodiment of FIG. 6, seek operations from current track X 120 to target track Y 122 are shown, and as such, follow a seek profile selected according to whether the operation is performed in a non-queued or queued environment. The graphical representations shown illustrate the position of the transducer head relative to target track Y 122 versus time. A position plot of a non-queued seek profile is illustrated at 124 with a corresponding non-queued seek period (time to reach the target track) indicated at 126 and a non-queued settle period indicated at 128. A position plot of a queued seek profile is illustrated at 130, with a corresponding queued seek time period indicated at 132 and a queued seek settle period indicated at 134.

In the exemplary embodiment shown, non-queued seek profile 124 follows a more aggressive profile than queued seek profile 130, illustrated by reaching the target track Y 122 sooner. During aggressive non-queued seek 124, as the head approaches target track Y 122, the actuator contains a relatively large amount of energy and has more transients due to more excitation of mechanical resonances, and as such, "overshoots" target track Y 122, indicated at 136, until the servo system brings the transducer head into closer alignment with target track Y 122. Although non-queued seek 124 significantly "overshoots" target track Y 122 and may therefore require a relatively longer settle period 128, the overall time for completion of the seek including both seek time 126 and settle time 128 is still shorter than the corresponding time for queued seek 130. In some cases, the settle criteria to position the actuator after reaching the target track may be different than for a queued operation and, as such, may have a relatively short non-queued settle period 128.

A less aggressive queued seek is indicated at 130. Note that the queued seek 130 arrives at the target track Y 122 later than non-queued seek 124. Although the less aggressive queued seek 130 also "overshoots" target track Y 122 indicated at 137, the actuator contains less energy as it approaches target track Y 122, and as such, exhibits significantly less overshoot and smaller transients, and therefore settles into relatively closer alignment with target track Y 122 during queued settle period 134. Queued seek 130 is less aggressive than non-queued seek 124, and therefore may take less time to settle. Nevertheless as indicated by the comparative lengths of non-queued seek 124 and queued seek 130 in conjunction with corresponding settle periods 128 and 134, the more aggressive seek allows for improved performance albeit at some sacrifice of predictability.

The characteristics of the seek profile or the settle criteria may be changed to optimize the data access times for commands in a queued or non-queued environment. For example, in a queued environment, consistency and predictability of seek are very important. The cumulative time required to execute a series of queued commands relies critically on the execution of each command being predictable and consistent in order to maintain the optimization intended by command re-ordering. As such, in a queued environment it is desirable to have a less aggressive seek profile and/or settle period in exchange for improved predictability of each command.

In a non-queued environment, it may be desirable to have much more aggressive seeks in order to achieve improved data access times. Performance, as measured by benchmarks, can be improved when a more aggressive (shorter time to arrival on track) seek profile is employed for commands in a non-queued environment. On average, a seek in a non-queued environment has one-half revolution to settle. In contrast, in a queued environment specific latencies are relied upon for execution of a series of consecutive commands. Although the more aggressive seek on occasion causes a less predictable settling period after arrival on track, taken as a whole the performance of a disk drive for executing non-queued commands is measurably improved.

Figure 7:
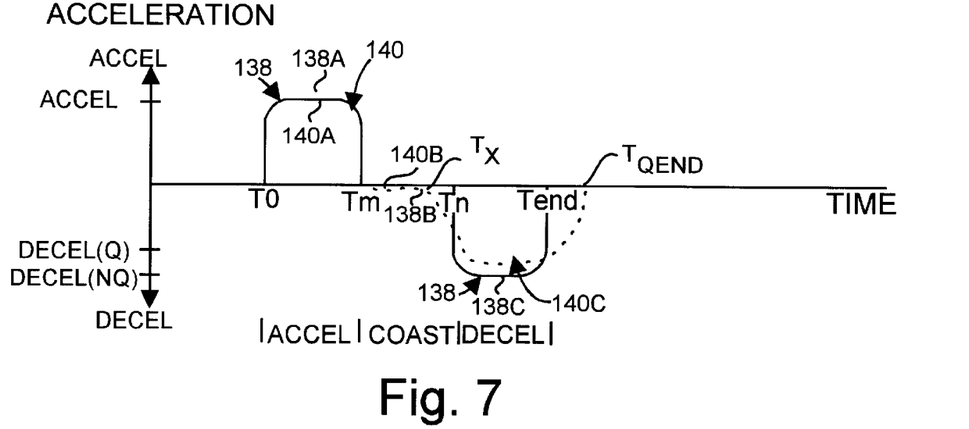
FIG. 7 is a graph illustrating one exemplary embodiment of a queued and non-queued seek profile for a given distance showing a plot of acceleration versus time, for use with a hard drive in accordance with the present invention.
Figure 8:
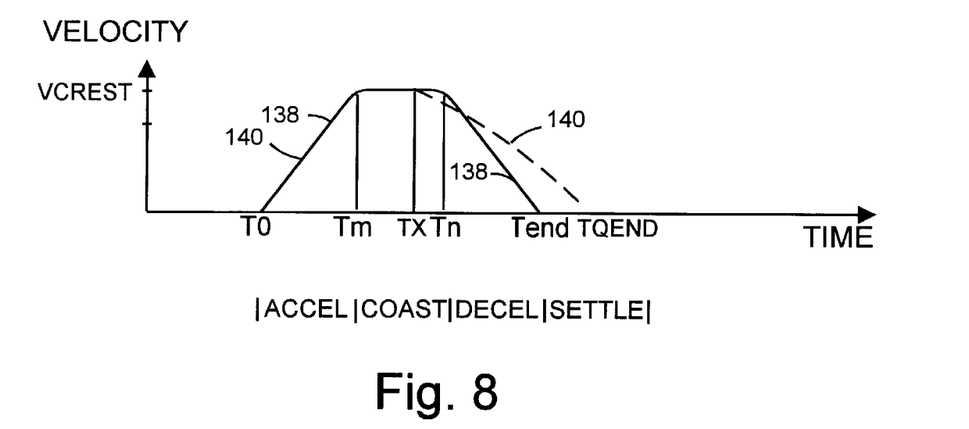
FIG. 8 is a graph illustrating queued and non-queued velocity seek profiles corresponding to the queued and non-queued acceleration seek profiles of FIG. 7.
Figure 9:
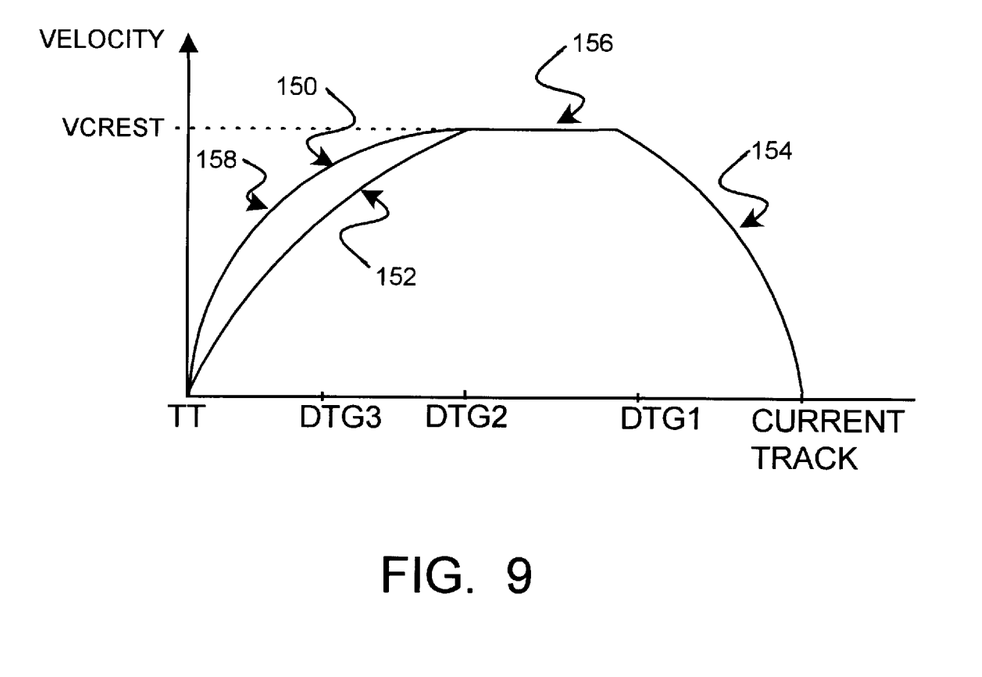
FIG. 9 is a graphical representation illustrating a velocity seek profile of a head as it moves from a current track to a target track for a hard disk drive having different queued and non-queued seek profiles in accordance with the present invention.

As previously described herein, a seek profile may be described in terms of acceleration, velocity, or position. In FIGS. 7, 8, and 9, one exemplary embodiment of different queued or non-queued seek profiles for a given seek distance for execution of a command for optimizing data access times in a disk drive in accordance with the present invention is illustrated. In FIGS. 7 and 8, commanded acceleration and velocity seek profiles are graphically illustrated. In FIG. 9, desired velocity trajectories are illustrated for execution of a queued or non-queued seek operation along a corresponding seek distance.

In FIG. 7 and FIG. 8, a commanded non-queued seek profile is indicated at 138 having non-queued acceleration profile 138A, non-queued coast profile 138B, and non-queued deceleration profile 138C. A queued seek profile is indicated at 140, having queued acceleration profile 140A, queued coast profile 140B, and queued deceleration profile 140C. Portions of queued seek profile 140 are different than non-queued seek profile 138 in amplitude and duration, optimizing data access times for each type of command. In the particular embodiment shown, queued acceleration profile 140A is the same as non-queued acceleration profile 138A in amplitude and duration, queued coast profile 140B is different than non-queued coast profile 138B in amplitude and duration; and queued deceleration profile 140C is different than non-queued deceleration profile 138C in amplitude and duration.

In reference to non-queued seek profile 138, at time T0, the head is commanded to maximum acceleration, reaching acceleration ACCEL. This acceleration is held until the head reaches maximum velocity VCREST at time Tm, where Tm is the length of time required to reach maximum velocity. In this example, the maximum velocity VCREST is held (in a "coast" mode, indicated by non-queued coast profile 138B) until time $T_n$, at which time the head is commanded to maximum deceleration DECEL(NQ), and follows queued deceleration profile 138C until the head velocity decreases to zero at time Tend.

Referring to queued seek profile 140, at time T0 the head is commanded to maximum acceleration ACCEL following queued acceleration profile 140A. This acceleration is held until the head reaches maximum velocity VCREST at time $T_m$, where $T_m$ is the length of time required to reach velocity VCREST. In this example, the velocity VCREST is held (in a coast mode, following queued coast profile 140B) until time $T_x$, at which time the head is commanded to deceleration DECEL(Q) following write deceleration profile 140C until the velocity decreases to zero at time $T_{qend}$. Queued seek profile 140 begins to decelerate sooner than non-queued seek profile 138 (and as such has a shorter coast profile 140B). Queued seek profile 140 follows a much less aggressive deceleration profile 140C allowing for a more consistent and predictable settle period.

In FIG. 9, exemplary desired velocity trajectories are illustrated for execution of a non-queued or queued seek operation along a corresponding seek distance to target track TT. The graph plots desired velocity versus distance to go (DTG) or tracks to go to target track TT. Each plot is representative of a means or method of determining the desired head velocity for a given seek distance, which includes methods known to those skilled in the art. For example, the trajectory plot describing the profile velocity based on seek distance may comprise a calculation using equations stored in memory or may comprise a look-up table stored in memory, wherein the table includes desired velocity values corresponding to the number of tracks or distance remaining to the target. Other means or methods may become apparent to those skilled in the art after reading the disclosure of the present application.

In one embodiment, during a seek operation at each servo sample, the actual velocity of the head is calculated and compared to the desired profile velocity to determine the control effort to use based on the distance to go to reach the target track. In the exemplary embodiment of FIG. 9, the desired velocity profile for a non-queued seek operation is indicated at 150, and the desired velocity profile for a queued seek operation is indicated at 152. The deceleration portion of the queued velocity seek profile differs from the deceleration portion of the non-queued velocity seek profile by a coefficient. In particular, during the deceleration portion of the velocity profile, the queued seek profile 152 is determined by multiplying the algorithm (i.e., equation) describing the desired non-queued velocity profile 150 by a desired coefficient.

Also in the exemplary embodiment shown in FIG. 9, the acceleration portion of the desired velocity profiles are generally indicated at 154, the crest or coasting portion of the velocity profiles are generally indicated at 156, and the deceleration portion of the velocity profiles are generally indicated at 158. During the acceleration portion 154 of the desired velocity seek profile, the trajectories for non-queued seek profile 150 and queued seek profile 152 are substantially the same. At distance to go $DTG_1$ both non-queued seek profile 150 and queued seek profile 152 are in a "coast" mode where their velocities substantially are constant at velocity VCREST. The less aggressive queued seek profile 152 begins to decelerate at distance to go $DTG_2$. The more aggressive non-queued seek profile 150 begins to decelerate at distance to go $DTG_3$. Beginning at distance to go $DTG_3$, queued seek profile 152 follows a seek profile which is equal to the non-queued seek profile 150 multiplied by a coefficient, which in the exemplary embodiment shown, is equal to 0.9.

By independently optimizing the seek profiles for each type of seek, predictability and consistency may be achieved for queued seek profiles, while data access times may be reduced for non-queued seek profiles.

It is recognized the trajectories for achieving the non-queued and queued seek profiles may be implemented in many ways. Suitably, an acceleration trajectory is accomplished by applying maximum acceleration for a given length of time, or until a desired state is reached. According to another embodiment, the acceleration trajectory is accomplished by applying a constant acceleration, but less than maximum acceleration. Another embodiment involves tracking a pre-defined trajectory. In one preferred embodiment for the coast mode, the velocity is held constant. One embodiment for the deceleration trajectory involves providing a look-up table for each type of seek profile relating to the distance from the current track to the target track, and the desired velocity for that distance. Another embodiment includes one or more polynomial equations describing the position versus the desired velocity relationship. Other implementations will become apparent to those skilled in the art after reading the disclosure of the present invention.

Figure 10:
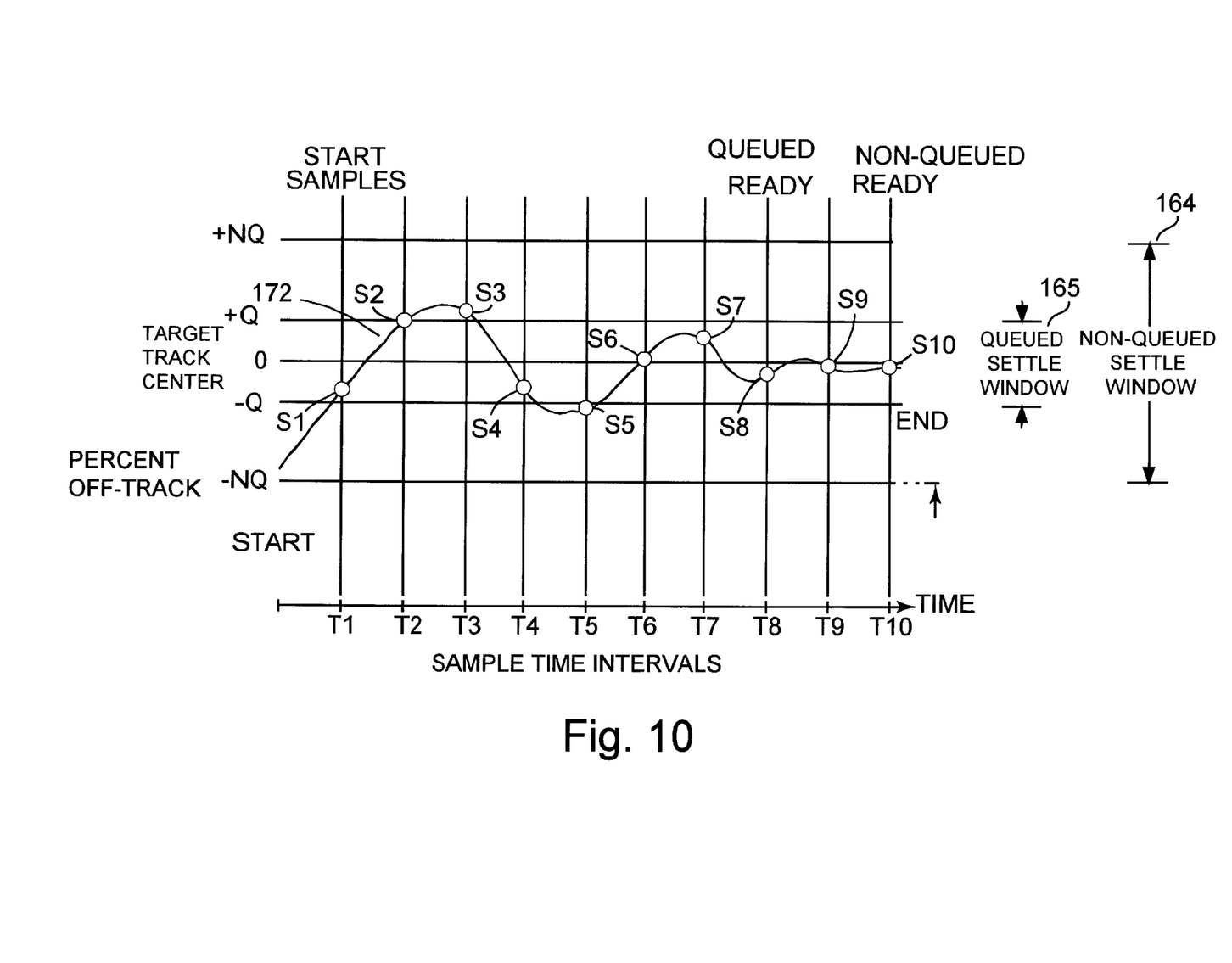
FIG. 10 is a diagram illustrating a portion of a seek operation including positioning and alignment of a disk drive head within a queued settle window or non-queued settle window for execution of a command.

In FIG. 10, a position plot illustrates a settle portion of a seek operation, including positioning and alignment of a disk drive actuator head within a non-queued "settle" window 164 or queued "settle" window 165 for execution of a command. The graphical representation illustrates the use of different settle criteria for execution of a non-queued operation or queued commands. Position plot 172 illustrates the position of a transducer head relative to TARGET TRACK CENTER, during the settling period.

In one embodiment of the invention, a NON-QUEUED SETTLE WINDOW 164 and a QUEUED SETTLE WINDOW 165 are defined and in the exemplary embodiment shown, are not the same width. The NON-QUEUED SETTLE WINDOW 164 is defined as the head position limits relative to TARGET TRACK CENTER and is dependent upon track pitch (i.e., track density). A non-queued read or write operation cannot be executed without undue risk of error if the transducer head is positioned outside of the NON-QUEUED SETTLE WINDOW 164. Similarly, QUEUED SETTLE WINDOW 165 defines the position limits relative to TARGET TRACK CENTER in which a queued operation may be executed. A read or write command in a queued environment is not allowed to be executed when the transducer is positioned outside of the QUEUED SETTLE WINDOW 165.

Since a transducer head may over shoot TARGET TRACK CENTER as the servo system brings it into alignment with TARGET TRACK CENTER during the settling period, it is necessary to sample the position of the transducer head relative to TARGET TRACK CENTER to ensure error free execution of a non-queued operation or queued operation. Position samples of transducer head 102 relative to TARGET TRACK CENTER are taken by the disk drive servo system at regular time intervals, indicated at T1, T2, T3, T4, T5, T6, T7, T8, T9 and T10. The corresponding samples on position plot 172 are indicated as S1, S2, S3, S4, S5, S6, S7, S8, S9, and S10.

In one embodiment, if a desired number of samples fall within the desired NON-QUEUED SETTLE WINDOW 164 or QUEUED SETTLE WINDOW 165, the servo processor 96 will determine "non-queued ready" or "queued ready" (i.e. the transducer head 64 is positioned within a predetermined distance from the target track center). For the exemplary seek operation shown in FIG. 10, it is desirable to have a wider non-queued settle window than a queued settle window. As an example, the settle criteria may stipulate 10 samples within the NON-QUEUED SETTLE WINDOW 164 for "non-queued ready" and 3 samples within the QUEUED SETTLE WINDOW 165 for "queued ready". The transducer head 64 is non-queued ready after sample S10 since ten samples S1, S2, S3, S4, S5, S6, S7, S8 S9 and S10 all fall within the NON-QUEUED SETTLE WINDOW 164. The transducer head 64 is queued ready after sample S8, since it is positioned within the QUEUED SETTLE WINDOW 165 for three samples S6, S7, and S8. It is beneficial to reduce the number of required samples in the smaller queued window as the window is smaller to begin with and increasing the number of required samples increases the chance of encountering a sample outside the window, thus compromising predictability.

As illustrated, disk drive data access times are optimized by employing different settle criteria for non-queued and queued seek profiles. Other embodiments employing different settle criteria for non-queued and queued seek profiles to achieve optimized data access times in accordance with the present invention will become apparent to those skilled in the art after reading the present application. For example, the non-queued settle window 164 may be the same size as the non-queued settle window 165, but required a different number of samples before the disk drive is determined to be "queued ready" or "non-queued ready". Other differences in settle criteria may be employed to achieve optimized data access time by employing settle criteria for non-queued seek commands which result in consistency and predictability of the seek, while providing non-queued seek profiles employing settle criteria for non-queued commands which allow for achieving reduced data access times.

Figure 11:
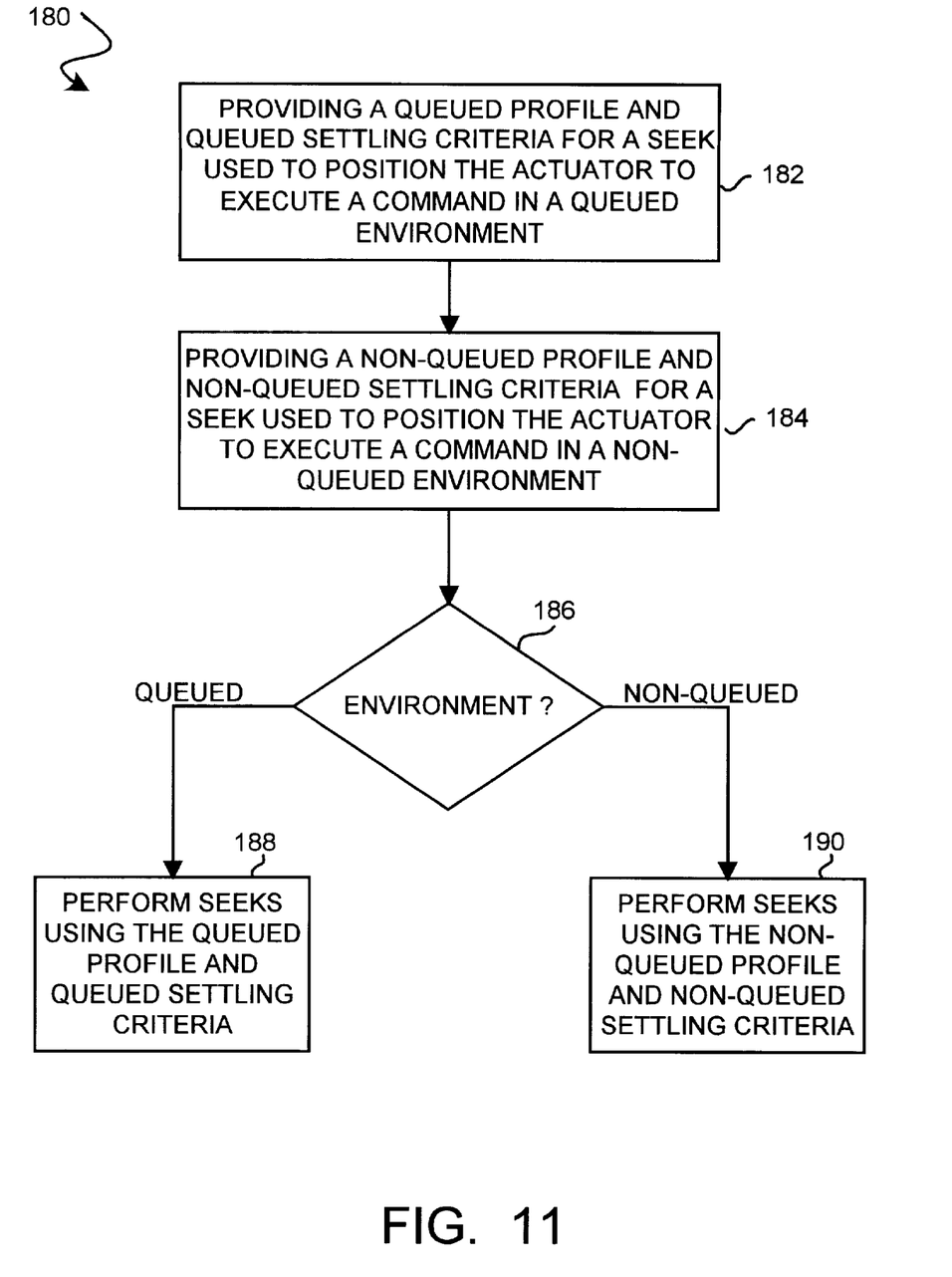
FIG. 11 is a flow chart illustrating one exemplary embodiment of a method for optimizing data access times in a hard disk drive in accordance with the present invention.

In FIG. 11, a flow diagram illustrating one exemplary embodiment of a method of optimizing data access time in a disk drive having an actuator and a servo system, in accordance with the present invention, by using different seek profiles and settle criteria for a command executed in a queued or non-queued environment is shown at 180. The servo system is directed to move the actuator as a result of an input/output command received from a host by an interface processor. The disk drive may execute the input/output command in a queued or non-queued environment. The servo system commands the actuator to perform a seek using a seek profile and defines settling criteria for the seek operation. The seek operation comprising an acceleration profile and a deceleration profile. In step 182, the method includes providing a queued seek profile and a queued settling criteria for a seek used to position the actuator to execute a command in a queued environment. In step 184, a non-queued seek profile and a non-queued settling criteria are defined for a seek used to position the actuator to execute a command in a non-queued environment, the non-queued seek profile being different than the queued seek profile. In step 186, a test is made for a queued or non-queued environment. If the disk drive is operating in a queued environment, the method proceeds to step 188 and seeks are performed using the queued seek profile and settling criteria. If the disk drive is alternately operating in a non-queued environment, the method proceeds to step 190 and performs seeks using the non-queued seek profile and settling criteria. In one embodiment, the time required for performing a seek over a nominal distance using the non-queued seek profile is less than the time required for performing a seek over the nominal distance using the queued seek profile. The queued and non-queued seek profiles may each comprise a trajectory plot providing a target velocity versus distance to go.

In one aspect, the step of providing a queued seek profile further includes the steps of providing a queued coefficient and determining the queued seek profile by multiplying the queued coefficient by the base profile. In yet another aspect, the step of providing a queued seek profile includes the step of determining the queued seek profile by multiplying the non-queued seek profile by a coefficient, wherein the coefficient is less than one.

In another aspect, the non-queued settling criteria is different than the queued settling criteria. In one application, the settling criteria includes a window which defines the required proximity of the actuator to a target track for execution of a command in a queued or a non-queued environment. Providing the queued settling criteria includes the step of providing a queued settle window, and providing the non-queued settling criteria includes the step of providing a non-queued settle window, the non-queued settle window being different than the queued settle window. In one aspect, the non-queued settle window is narrower than the queued settle window. The method may further include sampling the position of the actuator at predetermined time intervals. Commands are executed in a queued or non-queued environment after a desired number of samples fall within the corresponding queued settle window or non-queued settle window. In one aspect, the desired number of samples for the queued settle window is smaller than the desired number of samples for the non-queued settle window.

We claim:

1. A method of performing a seek operation in a disk drive connectable to a host, the disk drive having a servo system, the host providing an input/output command to the disk drive, the input/output command being executed in a queued or a non-queued environment, the servo system performing the seek operation as a result of the input/output command, the method comprising the steps of:

providing a queued seek profile and a queued settling criteria to the servo system for performing the seek operation when the input/output command is being executed in the queued environment; and providing a non-queued seek profile and a non-queued settling criteria to the servo system for performing the seek operation when the input/output command is being executed in the non-queued environment, wherein the non-queued seek profile is different than the queued seek profile.

2. The method of claim 1, whereby the time required for performing a seek over a nominal distance using the non-queued seek profile is less than the time required for performing a seek over the nominal distance using the queued seek profile.

3. The method of claim 1, wherein the queued and non-queued seek profiles each comprise a plot providing a target velocity versus distance to go.

4. The method of claim 1, further comprising the step of providing a base seek profile for the seek operation; and wherein the step of providing a non-queued seek profile further comprises the steps of providing a non-queued coefficient and determining the non-queued seek profile by multiplying the queued seek profile by the non-queued coefficient.

5. The method of claim 4, wherein the non-queued coefficient is greater than one.

6. The method of claim 1, further comprising the step of providing a base profile for the seek operation; and wherein the step of providing a queued seek profile further comprises the steps of providing a queued coefficient and determining the queued seek profile by multiplying the queued coefficient by the base seek profile.

7. The method of claim 1, wherein the step of providing a queued seek profile further comprises the step of determining the queued seek profile by multiplying the non-queued seek profile by a coefficient, wherein the coefficient is less than one.

8. The method of claim 1, wherein the step of providing the queued seek profile further includes the step of providing a queued acceleration profile, and wherein the step of providing a non-queued seek profile further includes the step of providing a non-queued acceleration profile, the queued acceleration profile being different than the non-queued acceleration profile for a respective seek distance.

9. The method of claim 1, wherein the step of providing the queued seekprofile further includes the step of providing a queued velocity profile, and wherein the step of providing a non-queued seek profile further includes the step of providing a non-queued velocity profile, the queued velocity profile being different than the non-queued velocity profile for a respective seek distance.

10. The method of claim 1, wherein the non-queued settling criteria is different than the queued settling criteria.

11. The method of claim 1, wherein the settling criteria includes a window which defines the required proximity of the actuator to a target track for execution of a command in a queued or a non-queued environment, wherein providing the queued settling criteria includes the step of providing a queued settle window, and wherein providing the non-queued settling criteria includes the step of providing a non-queued settle window, the non-queued settle window being different than the queued settle window.

12. The method of claim 11, wherein the non-queued settle window is wider than the queued settle window.

13. The method of claim 11, further comprising the steps of:

providing a position err-or signal to the servo system at predetermined time intervals; and executing the commands in a queued or non-queued environment after a desired number of samples fall within the corresponding queued settle window or non-queued settle window.

14. The method of claim 13, wherein the desired number of samples for the queued settle window is smaller than the desired number of samples for the non-queued settle window.

15. A disk drive connectable to a host, the disk drive comprising:
- means for executing an input/output command provided by the host, the input/output command being executed in a queued or a non-queued environment;
- a servo system for performing a seek operation as a result of the input/output command;
- means for providing a queued seek profile and a queued settling criteria to the servo system for performing the seek operation when the input/output command is being executed in the queued environment; and
- means for providing a non-queued seek profile and a non-queued settling criteria to the servo system for performing the seek operation when the input/output command is being executed in the non-queued environment, wherein the non-queued seek profile is different than the queued seek profile.

16. The disk drive of claim 15, whereby the time required for performing a seek over a nominal distance using the non-queued seek profile is less than the time required for performing a seek over the nominal distance using the queued seek profile.

17. The disk drive of claim 15, wherein the queued and non-queued seek profiles each comprise a plot providing a target velocity versus distance to go.

18. The disk drive of claim 15, further comprising a base profile for the seek operation, wherein the base profile for the seek operation is defined by a plot providing a target velocity versus distance to go; and wherein the non-queued seek profile further comprises a non-queued coefficient, and the non-queued seek profile is determined by multiplying the non-queued coefficient by the queued seek profile for a respective distance to go.

19. The disk drive of claim 18, wherein the non-queued coefficient is greater than one.

20. The disk drive of claim 15, further comprising a base profile for the seek operation, wherein the base profile is defined by a plot providing a target velocity versus distance to go; and wherein the queued seek profile further comprises a queued coefficient and the queued seek profile is determined by multiplying the queued coefficient by the target velocity for a respective distance to go.

21. The disk drive of claim 15, wherein the queued seek profile is determined by multiplying the non-queued seek profile by a coefficient, wherein the coefficient is less than one.

22. The disk drive of claim 15, wherein the queued seek profile further includes a queued acceleration profile, and wherein the non-queued seek profile further includes a non-queued acceleration profile, the queued acceleration profile being different than the non-queued acceleration profile for a respective seek distance.

23. The disk drive of claim 15, wherein the queued seek profile further includes a queued velocity profile, and wherein the non-queued seek profile further includes a non-queued velocity profile, the queued velocity profile being different than the non-queued velocity profile for a respective seek distance.

24. The disk drive of claim 15, further comprising means for receiving a command from a host; and means for determining whether the command is a queued command or a non-queued command.

25. The disk drive of claim 24, wherein the means for determining includes a flag associated with the queued command and the non-queued command, wherein the flag is representative of whether the command is a queued command or a non-queued command.

26. The disk drive of claim 15, wherein the non-queued settling criteria is different than the queued settling criteria.

27. The disk drive of claim 15, wherein the settling criteria includes a window which defines the required proximity of the actuator to the target track for execution of a command in a queued or a non-queued environment, wherein the queued settling criteria includes a queued settle window, wherein the non-queued settling criteria includes a non-queued settle window, the non-queued settle window being different than the queued settle window.

28. The disk drive of claim 27, wherein the non-queued settle window is wider than the queued settle window.

29. The disk drive of claim 27, further comprising:
- means for sampling the position of the actuator at predetermined time intervals; and
- means for executing a command in a queued or non-queued environment after a desired number of samples fall within the corresponding queued settle window or non-queued settle window.

30. The method of claim 27, wherein the desired number of samples for the queued settle window is smaller than the desired number of samples for the non-queued settle window.

* * * * *